(12) United States Patent
Vandervort (10) Patent No.: US 8,775,444 B2
(45) Date of Patent: Jul. 8, 2014

(54) GENERATING A SUBSET AGGREGATE DOCUMENT FROM AN EXISTING AGGREGATE DOCUMENT

(75) Inventor: David Russell Vandervort, Walworth, NY (US)

(73) Assignee: Xerox Corporation, Norwalk, CT (US)

( * ) Notice: Subject to any disclaimer, the term of this patent is extended or adjusted under 35 U.S.C. 154(b) by 43 days.

(21) Appl. No.: 12/915,754

(22) Filed: Oct. 29, 2010

(65) Prior Publication Data
US 2012/0109957 A1     May 3, 2012

(51) Int. Cl.
*G06F 17/30*     (2006.01)

(52) U.S. Cl.
USPC ..................................... 707/755; 707/803

(58) Field of Classification Search
USPC .......... 707/694, 737, 739, 752, 999.101, 754, 707/755, 776, 796, 803, 811
See application file for complete search history.

(56) References Cited

U.S. PATENT DOCUMENTS

| | | | |
|---|---|---|---|
| 6,049,812 A | 4/2000 | Bertram et al. | |
| 6,356,898 B2 | 3/2002 | Cohen et al. | |
| 6,377,983 B1 | 4/2002 | Cohen et al. | |
| 6,691,163 B1 | 2/2004 | Tufts | |
| 6,877,137 B1 | 4/2005 | Rivette et al. | |
| 7,159,023 B2 | 1/2007 | Tufts | |
| 7,266,548 B2 * | 9/2007 | Weare | 1/1 |
| 7,389,301 B1 * | 6/2008 | Mazzagatti et al. | 1/1 |
| 7,676,463 B2 * | 3/2010 | Thompson et al. | 707/999.005 |
| 2002/0138486 A1 | 9/2002 | Rishel | |
| 2004/0237037 A1 | 11/2004 | Sweet et al. | |
| 2005/0076000 A1 | 4/2005 | Sweet et al. | |
| 2005/0188300 A1 | 8/2005 | Sweet et al. | |
| 2006/0085492 A1 | 4/2006 | Singh et al. | |
| 2010/0241940 A1 | 9/2010 | Rao et al. | |
| 2010/0241951 A1 | 9/2010 | Vandervort | |

FOREIGN PATENT DOCUMENTS

| | | |
|---|---|---|
| EP | 0957437 A2 | 11/1999 |
| WO | 99/12109 | 3/1999 |

OTHER PUBLICATIONS

U.S. Appl. No. 12/731,694, "Validating Aggregate Documents," David Russell Vandervort, filed Mar. 25, 2010.
M. Dontcheva, S.M. Drucker, G. Wade, D. Salesin and M.F. Cohen, "Collecting and Organizing Web Content," Personal Information Managment—A SIGIR 2006 Workshop, pp. 44-47.
"Help: Introduction to Semantic MediaWiki", http://semantic-mediawiki.org/wiki/Help:Introduction_to_Semantic_MediaWiki, 3 pages, Aug. 6, 2008.
Bush, Vannevar, "As We May Think," The Atlantic Online, www.theatlantic.com;doc/print/194507/bush, 12 pages, Jul. 1945.
OCLC News Releases, "OCLC's New Web Harvester Captures Web Content to Add to Digital Collections," http://www.ocic.org/news/releases/200829.htm, 2 pages, Jul. 29, 2008.
European Search Report and Written Opinion, Jul. 6, 2010.

* cited by examiner

*Primary Examiner* — Marc Filipczyk
(74) *Attorney, Agent, or Firm* — Hoffmann & Baron, LLP (57) ABSTRACT

Embodiments described herein are directed to generating a subset aggregate document from an existing aggregate document. Data pages in an existing aggregate document that satisfy node selection criteria are identified. An aggregate document slice is created that includes the data pages that satisfy the node selection criteria. Connections between the data pages from the existing aggregate document to the aggregate document slice are imported to form at least one continuous path with the data pages.

17 Claims, 9 Drawing Sheets

```
<traildoc application="XXXXX" version="X.X">
...
<children>
    <node type="node" hash=58855dc2...>
        <name>Topic 2</name><desc>Intro to...</desc>
        <children>
            <node type="reference" hash=58855dc4.../>     ◄─441
        </children>
    </node>
    <node type="node" hash=58855dc4...>
        <name>Topic 4</name><desc>Elementary...</desc>
        <children>
            <node type="reference" hash=58855dc8.../>
        </children>
    </node>
    <node type="node" hash=58855dc8...>
        <name>Topic 8</name><desc>...for beginners</desc>
        <children>
            <node type="reference" hash=58855dc11.../>
        </children>
    </node>
    ...
</children>
...
</traildoc>
```

320 — first node block (Topic 2)
340 — second node block (Topic 4)
360 — third node block (Topic 8)

GENERATING A SUBSET AGGREGATE DOCUMENT FROM AN EXISTING AGGREGATE DOCUMENT

BACKGROUND

1. Technical Field

The presently disclosed embodiments are directed to generating an aggregate document slice from an existing aggregate document in a computing environment.

2. Brief Discussion of Related Art

Networks, such as intranets and the Internet, give people access to vast amounts of networked documents from different sources. Recently, the notion of aggregate documents has been introduced. An aggregate document can be generated using a collection of separate individual documents from different sources (e.g., source documents). One or more pages of the source documents can be included as an ordered sequence of data pages or sub-documents in the aggregate document.

An aggregate document can be represented as a content trail, where each subdocument or data page in the aggregate document can be a node in the trail. Users can "walk" the trail by following nodes of the trail along a path defined by relationships between the nodes. A trail can be displayed as a map of the connections between nodes, giving users a quick view of the high level structure of the aggregate document and the possible pathways users can take through the trail to discover information about topics included in the aggregate document. For example, a content trail can be displayed as a directed graph. As the number of subdocuments or data pages increases in the aggregate document, the map can become increasingly complex and difficult to interpret.

For example, an aggregate document constructed for the purpose of organizing research materials for a graduate thesis could grow quite large and have numerous subtopics resulting in complex relationships forming complex patterns and/or pathways. Comprehending the context of the different nodes and the paths through the subtopics can become difficult. Even with zoom and pan capabilities, focusing on only the portions of the map of the content trail corresponding to the aggregate document a user considers relevant at a given time can be a challenge.

Figure 8:
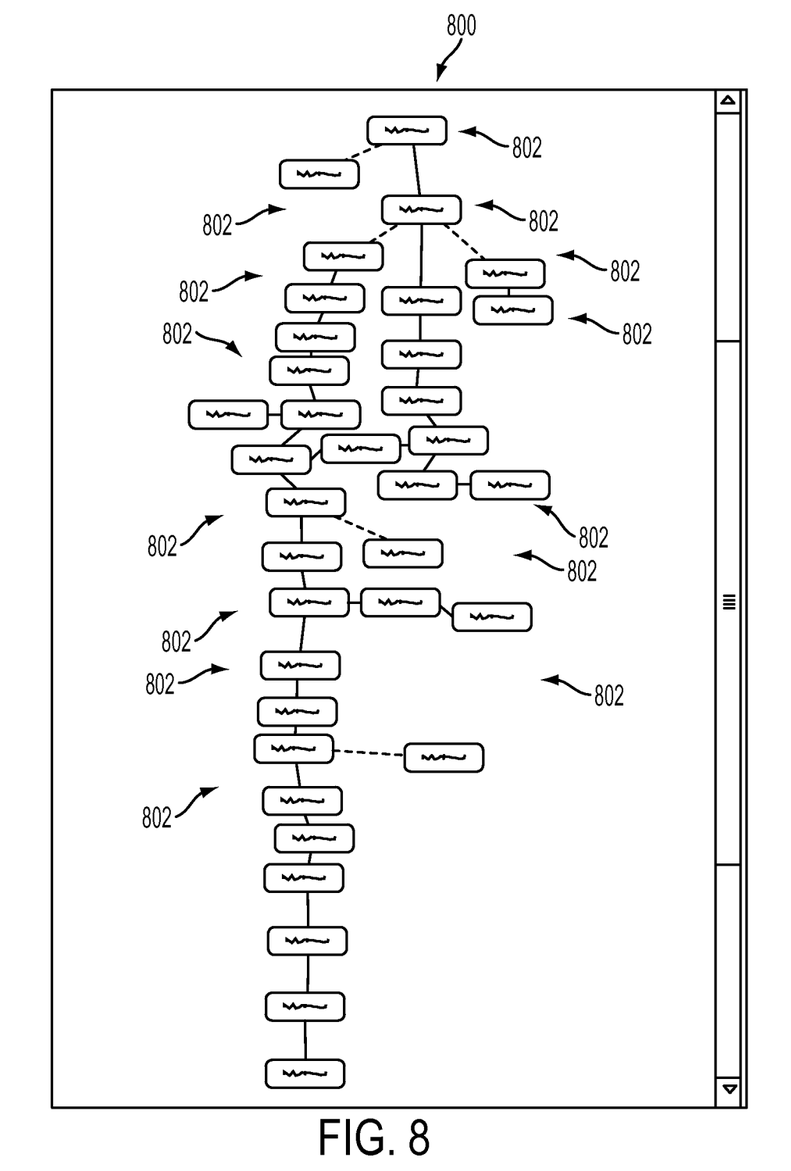
FIG. 8 is an exemplary map of a content trail.

A sample of a moderately complex content trail 800 is shown in FIG. 8. Although there are only 35 nodes 802 and few branches, the trail 800 has become almost unmanageable. This management problem is of comprehension, or in selecting which portions are most interesting. If a user wished to walk a designated default path from start to finish in their browser, it would be a simple process. Likewise, exporting the entire aggregate document represented by the trail to a single printable format would be no harder than for any other trail. However, in both the following and printing cases, the users would be forced to accept the content and organization of the whole and sift through it for the parts meaningful to them afterwards, leading to a prototypical case of information overload.

SUMMARY

According to aspects illustrated herein, there is provided a method for generating an aggregate document slice from an existing aggregate document. The method includes identifying data pages in an existing aggregate document that satisfy node selection criteria and creating an aggregate document slice. The aggregate document slice includes the data pages identified in the existing aggregate document that satisfy the node selection criteria. The method also includes importing connections between the data pages from the existing aggregate document to the aggregate document slice to form at least one continuous path with the data pages.

According to other aspects illustrated herein, there is provided a non-transitory computer readable medium storing instructions executable by a computing system including at least one computing device, wherein execution of the instructions implements a method for generating an aggregate document slice from an existing aggregate document. The method implemented by execution of the instructions includes identifying data pages in an existing aggregate document that satisfy node selection criteria and creating an aggregate document slice. The aggregate document slice includes the data pages identified in the existing aggregate document that satisfy the node selection criteria. The method implemented by execution of the instructions also includes importing connections between the data pages from the existing aggregate document to the aggregate document slice to form at least one continuous path with the data pages.

According to further aspects illustrated herein, there is provided a system for generating an aggregate document slice from an existing aggregate document. The system includes a computing system having at least one computing device. The computing system identifies data pages in an existing aggregate document that satisfy node selection criteria and creates an aggregate document slice. The aggregate document slice includes the data pages identified in the existing aggregate document that satisfy the node selection criteria. The computing system also imports connections between the data pages from the existing aggregate document to the aggregate document slice to form at least one continuous path with the data pages.

DETAILED DESCRIPTION

Exemplary embodiments are directed to creating an aggregate document slice from an existing aggregate document. An aggregate document slice can be created based on node selection criteria, which can be used to identify and copy or extract data pages from the existing aggregate document. Copied or extracted data pages can be inserted into the aggregate document slice. The aggregate document slice can inherit relationships connecting data pages in the existing aggregate document, can generate connections between nodes where discontinuities exist in the aggregate document slice, and can remove or omit broken connections, floating connections or discontinuities between data pages that are included in the aggregate document slice and data pages that are not included in the aggregate document slice.

Aggregate documents are highly useful for arranging related information from diverse sources into a form suitable for learning and exploration. Consider a trail constructed by a math teacher to guide students through a set of study materials on the web. There might be a set of basic/review nodes, another set of required nodes and yet another set of interesting or extra credit materials. In addition to these groupings, material might be divided into logic, set theory and graph theory. The teacher could prepare a separate trail for each combination of these possible groupings but this would be a great deal of repetitive work. The teacher could also create a separate guidebook, explaining the different categories of nodes and their purposes. Or, the teacher could simply allow students to create their own slices to focus their exploration of these course materials as needed. One student could create a slice based on tags for basic/review and logic and receive a new trail with one set of nodes. Another could filter on set theory only and get a completely different slice with a much wider range of material, still organized quite closely to the way the teacher intended.

As another example, a trail with nodes made up of information and previous stories about people employed by the federal government would be both highly useful and quick to grow to enormous size. The ability to create new slices based on government department, political affiliation and even previous scandals or issues, would be an invaluable tool for journalists needing a quick way to discover the background of breaking news. In this instance, the trail would act as part database, part encyclopedia and part briefing document. The links between nodes would be particularly useful in this context as they in some ways mirror relationships between people and provide perspective that cannot be gleaned from a chronological or alphabetical list of related stories.

As another example, consider a trail in a hypothetical prosecution of members of a criminal organization specializing in hacking banks Categories of nodes could include case law, witnesses, network evidence and background (which would include general information such as Wikipedia pages about computers and hacking, Microsoft vulnerability alerts and similar material). Being able to create slices based on each of these categories, possibly with other criteria to further target the focus, would be an invaluable aid for developing briefs, arguments and briefing documents for prosecutors as they prepare their case. Conversely, careful tagging of nodes could also aid finding and organizing materials that must, by law, be turned over to the defense during the discovery phase of a trail.

In each of the above examples, a trail is a useful starting point for creating a high level organization for broad information topics. The slicing unit facilitates creation of targeted sub-documents that greatly improve users' ability to study and use trails in a way that suits their needs. In this manner, users can customize the aggregate document slices to their own needs, choosing to view, walk, or print only those portions of an existing aggregate document that interest them at a given time, while still retaining the ability to view the relationships between these smaller portions (e.g., aggregate document slices) and the whole (e.g., an aggregate document from which the aggregate document slices are generated).

Thus, if an existing aggregate document about astronomy contains sections about history, planetary astronomy, solar astronomy and cosmology, users can find and study only the cosmology related pages, or only the planetary related pages, in a way as coherent in both navigation and printing as the existing aggregate allows.

As used herein, an "aggregate document" refers to a composite computer document formed from two or more separate and distinct source computer documents. Computer documents that can be included in an aggregate document can include web pages, one or more pages of word processing documents (e.g., Microsoft Word documents), images, one or more pages of portable document format (PDF) documents, one or more sheets of spreadsheet documents (e.g., Microsoft Excel spreadsheets), one or more slides of presentation documents (e.g., Microsoft PowerPoint documents), electronic publication (ePub) files, and the like.

As used herein, an "existing aggregate document" refers to an aggregate document that exists and can be used to form an aggregate document slice, where an "aggregate document slice" refers a new aggregate document generated using a subset of data pages from the existing aggregate document.

As used herein, "node selection criteria" refers to parameters, values, characters, and the like. For example, node selection criteria can include a string of characters that form a word or phrase.

As used herein, a "data page" refers to a page from a document, such as a web page, a page from a word processing document, a page from a portable document file (PDF), and the like.

An example of an aggregate document can be a "content trail", which refers to one or more organized ordered sequences of data pages having user-assigned relationships to define at least one path, where "organize" refers to specifying or otherwise forming one or more ordered sequences and an "ordered sequence" refers to a defined arrangement of the data pages as a partially ordered set, a totally-ordered set, a strict sequence, and the like.

A user can generate a content trail by organizing selected data pages into a desired, ordered sequence by forming relationships between the data pages to define a structure of the content trail, where a "relationship" refers to an association or connection between two or more data pages generally defined by a user. Relationships between the selected data pages can be defined by the user to interconnect the data pages associated with the content trail. Relationship between two or more data pages can occur external to the data pages such that relationships are not inserted into, or defined within, the data pages. In this manner, relationships can define external connections between independent discrete data pages so that a connection between the data pages is not defined by hyperlinks within the data pages. A relationship may be arbitrarily or otherwise defined and may be explicit or implicit in nature. Data pages that have a relationship are referred to herein as having "connections" or being "connected" or "interconnected".

A content trail can include metadata corresponding to the data pages and the relationships of the data pages to other data pages in the content trail, where "metadata" is generally understood by those skilled in the art to refer to information about information. Examples of metadata that can be associated with references to data pages include a source location of the data pages, titles, names, labels, relationships between the data pages and other data pages, the referenced data pages itself, permission levels associated with nodes for various sorts of editing and sharing, copyright information for individual referenced pages, version information for dynamic pages, and the like.

An "underlying data structure" refers to a data file that maintains information, such as metadata, concerning the data pages of an aggregate document. The underlying data structure can be an XML document, database schema, or other suitable data format. As the user develops the content trail, the underlying data structure is maintained, such that when a data page is inserted into the content trail, the underlying data structure is updated to include information concerning the data page. Likewise, when a relationship is defined by the user, the underlying data structure is updated to reflect the relationship. Therefore, the underlying data structure can include references to the data page, such as a location at which a data page can be retrieved, and the relationships between the data pages.

In some embodiments, the content trail can be represented as a visual diagram or map in the form of, for example, a directed graph, where the nodes, represented as circles or other shapes, reference the selected data pages and the edges, represented as lines with directional arrows extending between nodes, illustrate the relationships between the referenced data pages. The edges in the directed graph can represent a relationship connecting the nodes to impose a partial or total ordering on the data pages associated with the content trail. The edges can be created explicitly, or can be created to mirror naturally-occurring relationships of the data pages.

In some embodiments, a trail generator can be used to generate a data model of a content trail using data pages discovered by a user. The data pages can be collected without regard to an absence of an existing link structure between the data pages. The trail generator can allow a user to generate a content trail having one or more sequences of data pages arranged in a user defined order and having user-defined relationships between the data pages. For example, the trail generator can allow a user to organize selected data pages based on the user's preferences. In some embodiments, the data model can be generated and displayed as a directed graph including nodes as references to the data pages and edges as relationships between the nodes. An exemplary trail generator and content trails generated using the exemplary trail generator are described in more detail in co-pending U.S. patent application Ser. No. 12/408,397, entitled "Trail-Based Data Content Discovery, Organization, and Processing" and filed on Mar. 20, 2009, the disclosure of which is incorporated herein by reference in its entirety.

As used herein, "creating" refers to generating, forming, building, bringing into being, and the like.

As used herein, "importing" refers to transferring or copying from one object or thing to another object or thing.

As used herein, "searching" refers to examining an object or thing to find something.

As used herein, "satisfy" refers to fulfilling requirements and/or conditions, for example by identifying matching or similar occurrences in metadata of an existing aggregate document to that of node selection criteria.

As used herein, "copying" refers to replicating, reproducing, reusing, regenerating, and the like.

As used herein, "omitting" refers to leaving out or discarding.

As used herein, a "website" refers to a set of web pages generally located on the same server with the same domain name and "web page" is a single page generally associate with a Uniform Resource Identifiers (URIs) address, such as a Uniform Resource Locator (URL) address. To move from first web page to second web page of a website, the first web page generally includes a hyperlink to the second web page embedded therein that must be selected by a user.

As used herein, a "web browser" or "browser" refers to a software application implemented using a computing device to access and navigate the Internet, Intranet, or other compilation of files generated in suitable mark-up languages.

As used herein, a "source location" refers to a location at which a computer file can be retrieved. Source locations can be referenced in underlying documents and can include addressing schemes, such as Uniform Resource Locators (URLs), Uniform Resource Identifiers (URIs), extensible mark-up language (XML) path (XPath) addresses, sequential numbering and/or alphabetizing schemes, descriptive text identifiers, such as titles of the data pages, and the like.

As used herein, a "computing device" can be a mainframe, personal computer (PC), laptop computer, workstation, handheld device, such as a PDA, or the like, that includes a processing unit and is configured to implement the aggregate document slicing unit or at least a portion of the aggregate document slicing unit.

As used herein, a "computing system" refers to one or more computers configured to implement the slicing process using the aggregate document slicing unit.

A "repository" or "database" refers to a storage system in which information, such as content trail are stored. The information stored in the repository or database is accessible to one or more users, where "accessible" refers to the ability to retrieve information from the repository or database.

As used herein, a "path" refers to a contiguous sequence of data pages from a first data page to a last data page, where adjacent pages are connected based on a defined relationship. A path can diverge into two or more separate paths, where each path includes a sequence of data pages, and can converge into a single path, where two or more sequences of data pages join at a common data page.

Figure 1:
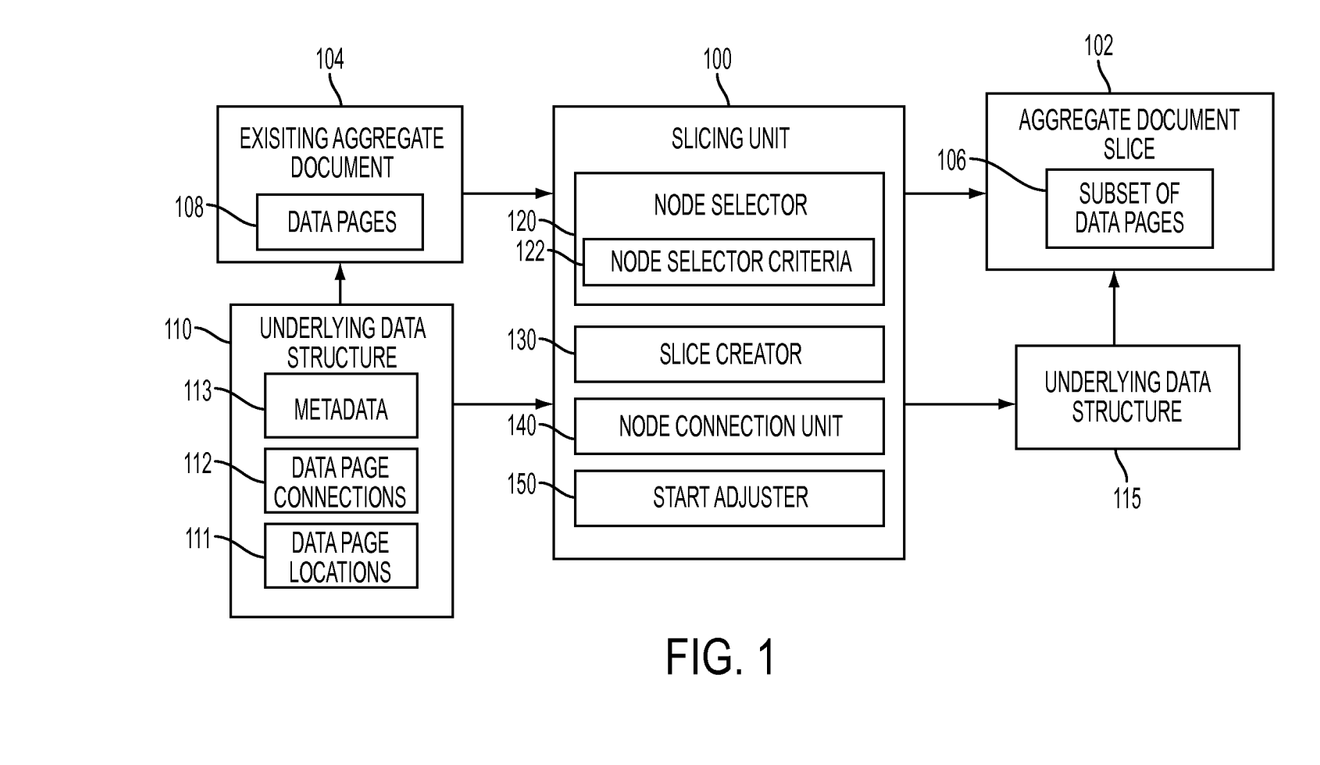
FIG. 1 depicts a block diagram of an exemplary aggregate document slicing unit for generating an aggregate document slice from an existing aggregate document.

FIG. 1 depicts a block diagram of an aggregate document slicing unit 100 (hereinafter "slicing unit 100") that includes a node selector 120, a slice creator 130, node connection unit 140, and start adjuster 150. The slicing unit 100 can be configured to perform a slicing process for creating an aggregate document slice 102 from an existing aggregate document 104. The aggregate document slice 102 can include a subset 106 of data pages 108 from the existing aggregate document 104. The aggregate document slice 102 can be output by, for example, storing, displaying, printing, e-mailing, faxing, posting the aggregate document slice 102 on a web site, and the like.

In some embodiments, the slicing unit 100 can use an underlying data structure 110 of the existing aggregate document 104 to generate an aggregate document slice 102 from an underlying data structure 115. The underlying data structure 110 of the existing aggregate document 104 can contain references 111 to locations of data pages 108 forming the existing aggregate document 104 and connections 112 between the data pages 108 establishing an ordered relationship between the data pages 108 as well as other metadata 113 associated with the data pages 106 of the existing aggregate document 104, such as a name, title, description, and the like associated with the data page. The portions 111, 112, and 113 corresponding to the subset 106 of data pages 108 can be included in the underlying data structure 115.

The node selector 120 can receive node selection criteria 122 from a user. The node selection criteria 122 can be a string of characters, which can form a word or phrase, to be compared to one or more metadata fields for data pages 108 in the existing aggregate document 104 and/or to the content of the data pages 108. Metadata 113 can include information about data pages in an aggregate document and can include name fields, title fields, source fields identifying a location at which a data page can be retrieved), description fields (e.g., short and/or long description fields), and the like, as well as relationships that define an order in which the data pages should be read and printed. Metadata 113 for data pages 108 in the existing aggregate document 104 can be searched to find cohesive groupings of data pages 108 corresponding to the node selection criteria 122.

Metadata fields for each of the data pages 108 in the existing aggregate document 104 are compared to node selection criteria 122, which can be entered by a user via a user interface. For example, a user can enter a topic of interest as node selection criteria 122 and the node selector 120 can search the metadata 116 of the existing aggregate document 104 for data pages including the topic of interest or a word or phrase similar to the topic of interest. In some embodiments, the node selection criteria 122 can be compared against selected metadata field types. For example, the search can be limited to title metadata fields for the data pages 108 in the existing aggregate document 104. For embodiments where the underlying data structure 110 is an XML file, the node selector 120 can step through the metadata fields in the XML file. When the node selector 120 identifies a data page referenced in the XML file that includes metadata matching, being similar to, and/or satisfying the node selection criteria 122, the node selector 120 can copy the portion of the XML file corresponding to the data page for use by the slice creator 130 to build the aggregate document slice 102.

In some embodiments, the node selector 120 can search the content of the data pages in an existing aggregate document. As one example, an underlying data structure can include a referenced location at which a data page can be retrieved. The node selector can retrieve the data page from the referenced location and can search the content of the data page to determine whether the content of the data page satisfies the node selection criteria. As another example, the content of one or more of the data pages for an existing aggregate document can be included in the underlying data structure. In this case, the node selector 120 can search the content of the data pages inline with the metadata.

The slice creator 130 can create the aggregate document slice 102 and/or an underlying data structure 115 to hold the results from the search performed on the existing aggregate document 104 by the node selector 120. Data pages or references thereto that have been copied from the existing aggregate document 104, along with metadata (name, title, description, tags, etc) for the data page can be inserted in to the aggregate document slice 102 and/or the underlying data structure 115, which represents a new record that is specific to the search results provided by the node selector 120. Rather than merely generating a way to find data, the slicing unit 100 regards the original data set as a document and uniquely seeks to produce a new, self-contained document composed of a subset of elements from the original existing document. The aggregate document slice 102 constitutes a complete aggregate document, which can be represented as a trail that can be manipulated as any other trail, meaning the aggregate document slices can be walked in a browser, printed, and/or sliced again.

For embodiments in which the underlying data structure of the aggregate documents (e.g., the original existing aggregate document and the aggregate document slice) are implemented as XML files, the slice creator 130 can create a new XML file as the underlying data structure 118 for the aggregate document slice 102. Portions copied from the XML file of the existing aggregate document 104 for the data pages can be inserted into the XML file for the aggregate document slice 102.

The node connection unit 140 can maintain relationships between adjacent nodes, can form new relationships between data pages to ensure that there are no orphan data pages (e.g., to ensure that data pages are connected to form one or more contiguous paths), and delete or remove floating or broken relationships resulting from copying a data page that connects to a data page that is not copied from the existing aggregate document 104. Existing relationships in the aggregate document 104 connecting copied data pages are also copied to the aggregate document slice 102. Connections between data pages can be shown on a map, such as a directed graph, of the content trail using arrows between nodes of the copied data pages. There can be multiple possible pathways in an aggregate document at the discretion of the user who created the aggregate document. When creating a slice, these pathways can be preserved when possible. If a data page has connections to another data page which was not copied because it did not satisfy the node selection criteria 112, then, rather than have a floating or broken connection, the connection is omitted or dropped. However, when both ends of a connection exist in the new slice, the connection can be copied from the existing aggregate document 104 to the aggregate document slice 102. The node connection unit 140 creates connections among results in order to retain the functionality of an aggregate document slice.

The node connection unit 140 can add connections to the slice 102 to ensure that there is at least one path to every data page so that there are no orphan data pages with exception of a start or root data page. In the process of copying data pages from the existing aggregate document 104, some of the data pages 108 may not satisfy the node selection criteria 122 and are not be copied. Any connections to and/or from these data pages are not copied, which can cause breaks, floating connections, or discontinuities in the pathways of the aggregate document slice. These breaks, floating connections, or discontinuities can disrupt a user's ability to follow the paths within it. Such breaks or discontinuities can also complicate generating a printable version of the aggregate document slice 102, since the path information (e.g., connections between data pages) are used to determine print sequences as well as browsing sequences. Functionally, breaks, floating connections or discontinuities can mean that the result of the slicing process is no longer a single document but several somewhat related documents. As this outcome can be undesirable, data pages in the aggregate document slice 102 can be checked for connections to the rest of the data pages in the aggregate document slice 102 and, if necessary, new connections can be generated to ensure that the aggregate document slice is continuous. That is, the slicing unit 100 ensures that every node except the starting node has at least one parent link (the base of an arrow on the map).

The start adjuster 150 can determine and set the navigation start point of the aggregate document slice. There can be at least one designated start point for an aggregate document slice 102. If the data page corresponding to the start point of the original existing aggregate document 104 is included in the filtered result set forming the aggregate document slice 102, then the data page is also designated as the start of the aggregate document slice 102. If data page that corresponds to the start point of the original existing aggregate document 104 is not included, another data page is chosen by the start adjuster 140 from the data pages included in the aggregate document slice. In some embodiments, a data page can be chosen that has no parent connections. The data page can be designated as the root of the trail. The existence of a fixed starting point aids both browsing and printing of aggregate documents.

Figure 2:
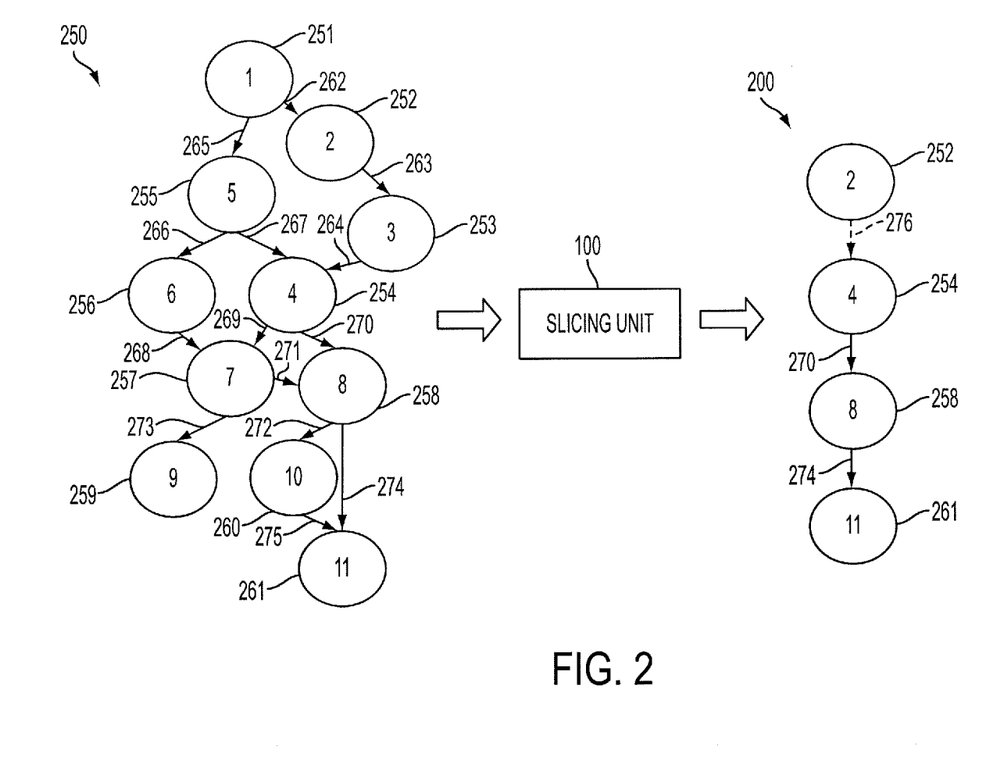
FIG. 2 shows an exemplary aggregate document slice generated from an existing aggregate document where the existing aggregate document and the aggregate document slice are content trails illustrated as directed graphs.

FIG. 2 illustrates creating an exemplary content trail slice 200 (e.g., an aggregate document slice) from an existing content trail 250 (e.g., an existing aggregate document). In the present example, the content trail 200 and the content trail 250 are illustrated as map views using directed graphs. The content trail 250 can include converging and diverging paths. Nodes 251-261 can represent data pages referenced by the content trail 250 and edges 262-275 can represent the relationship connecting the data pages in a defined ordered sequence in the content trail 250. Each of the data pages represented by the nodes 251-261 can be retrieved from different source document, which can have different source locations.

The content trail slice 200 can be generated by the unit 100 in response to the node selection criteria. For example, the slicing unit 100 can receive node selection criteria from a user and can identify nodes in the content trail 250 that satisfy the node selection criteria. In some embodiments, the slicing unit compares the node selection criteria to metadata associated with the content trail 250. When the slicing unit identifies a node that satisfies the node selection criteria, the slicing unit 100 can copy that data node into the content trail slice 200 so that the content trail slice 200 includes the data page referenced by the node. In the present example, the slicing unit 100 identified the nodes 252, 254, 258, and 261 as satisfying the node selection criteria and copied the nodes 252, 254, 258, and 261 to the content trail slice 200 from the content trail 250.

When the content trail 250 is sliced, some connections between nodes are copied to the content trail 200, some connections are omitted or removed, and some connections are generated. As one example, since nodes 254 and 258 were copied to the content trail slice 200, the edge 270 connecting the nodes 254 and 258 is also copied to maintain the relationship between nodes 254 and 258 in the content trail slice 200. As another example, since node 252 is copied, but node 255 is not, the edge 265 representing the connection from the node 252 to the node 255 is omitted or removed from the content trail slice 200. Likewise, since the node 254 is copied, but the node 255 is not, the edge 267 from the node 255 to the node 254 is omitted or removed from the content trail slice 200. As another example, since the node 252 is copied to the content trail slice 200, but none of the nodes to which the node 252 was directly connected were copied, a discontinuity existed in the content trail slice 200. In response, the slicing unit 100 generated a new connection, represented by edge 276, from the node 252 to the node 254 in the content trail slice 200.

In some embodiments, connections generated to prevent discontinuities can be generated based on the order of execution implemented by the slicing unit. For example, in the present example, the slicing unit can copy node 252 first and subsequently copied node 254. In some embodiments, the slicing unit 100 can determine the next node in the content trail slice 200 that is the closest in degree to the node 252, where the closest degree can be the node having fewest number of nodes between them. For example, in the present example, the node 252 connects to the node 254 through the node 253 so that the nodes 254 and 252 are separated by one degree, whereas the remaining nodes in the content trail slice 200 are separated from the node 252 by more than one degree in the content trail 250.

Figure 3A:
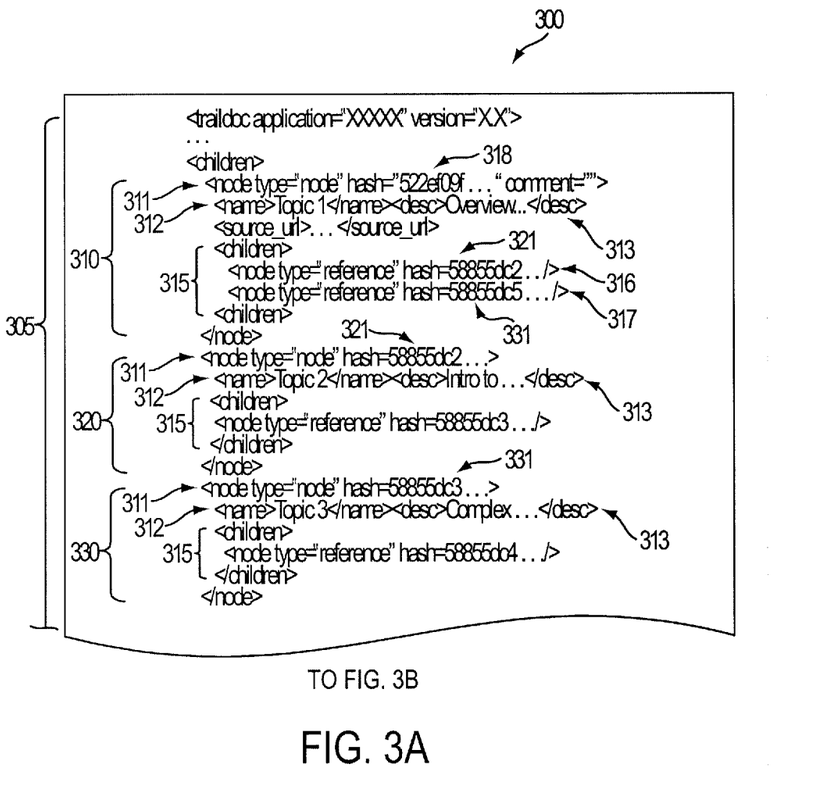
FIGS. 3A-B depicts an exemplary underlying data structure of an existing aggregate document.
Figure 3B:
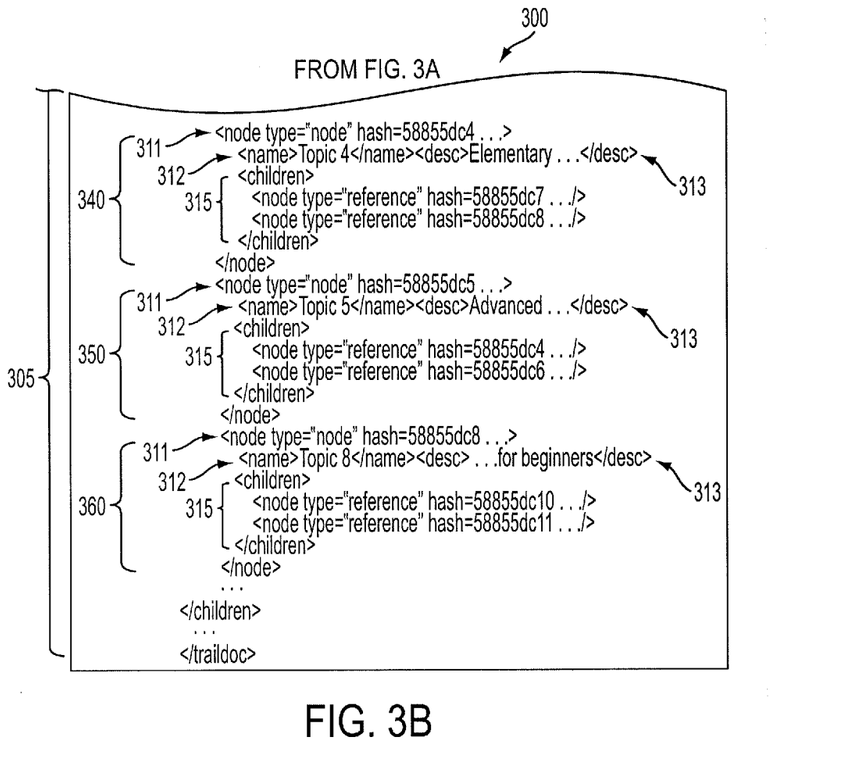

FIG. 3A-3B are an exemplary illustration of portions of an underlying XML document 300 for the content trail 250 of FIG. 2. The XML document 300 can define sections that can be mapped to nodes of a content trail representative of data pages in an aggregate document, as well as metadata associated with the data pages. In the present example, the XML document 300 includes a container section 305 that encapsulates the content trail within the XML document 300.

Sections 310, 320, 330, 340, 350, and 360 are included within the container section 305 and represent nodes of the existing content trail referencing data pages included in the existing aggregate document as well as the relationship of the nodes with other nodes in the content trail. Sections 310, 320, 330, 340, 350, and 360 include metadata fields in which information about the data pages associated with nodes defined by their respective sections. Some examples of metadata fields that can be included in the sections 310, 320, 330, 340, 350, and 360 can include a name, title, description, comment, source location, and the like. In the present example, the metadata fields included in the sections 310, 320, 330, 340, 350, and 360 have been limited for clarity. Those skilled in the art will recognize that the XML document 300 can include additional metadata fields, such as those disclosed in co-pending U.S. patent application Ser. No. 12/408,397, entitled "Trail-Based Data Content Discovery, Organization, and Processing" and filed on Mar. 20, 2009, the disclosure of which is incorporated herein by reference in its entirety.

Sections 310, 320, 330, 340, 350, and 360 can be identified as a node using tags 311. To identify the nodes within the XML document 300, the sections 310, 320, 330, 340, 350, and 360 can include unique identifiers specified in the tags 311. For example, the tag 311 of section 310 includes an identifier 318 that has been uniquely assigned to a node defined by section 310 in the XML document 300. Sections 310, 320, 330, 340, 350, and 360 can have node names specified in metadata fields 312, descriptions of the data pages associated with the nodes defined by sections specified in metadata fields 313, and relationship information specified in children tags 315. In the present example, the section 310 can correspond to the node 251, the section 320 can correspond to the node 252, the section 330 can correspond to the node 253, the section 340 can correspond to the node 254, the section 350 can correspond to the node 255, and the section 360 can correspond to the node 258 in FIG. 2.

The relationship of the node identified in section 310 to other nodes in the content trail can be represented as children of the node. In the present embodiment, the children tag 315 of section 310 can identify which nodes have been defined to be related to the node of section 310. For example, nodes identified by tags 316 and 317 have been defined to have a relationship with the node of section 310, which is illustrated as a line in a directed graph from the node defined by section 310 to each of the related nodes identified in tags 316 and 317. The tags 316 and 317 identify the nodes using the unique identifiers so that the tag 316 uses an identifier 321 that is used to identify the node defined by section 320 and the tag 317 uses an identifier 331 that is used to identify the node defined by section 350. In the present example, the node identified by tag 316 corresponds to the node 252 defined by section 320 and the node identified by tag 317 corresponds to the node 255 defined by section 350.

Figure 4:
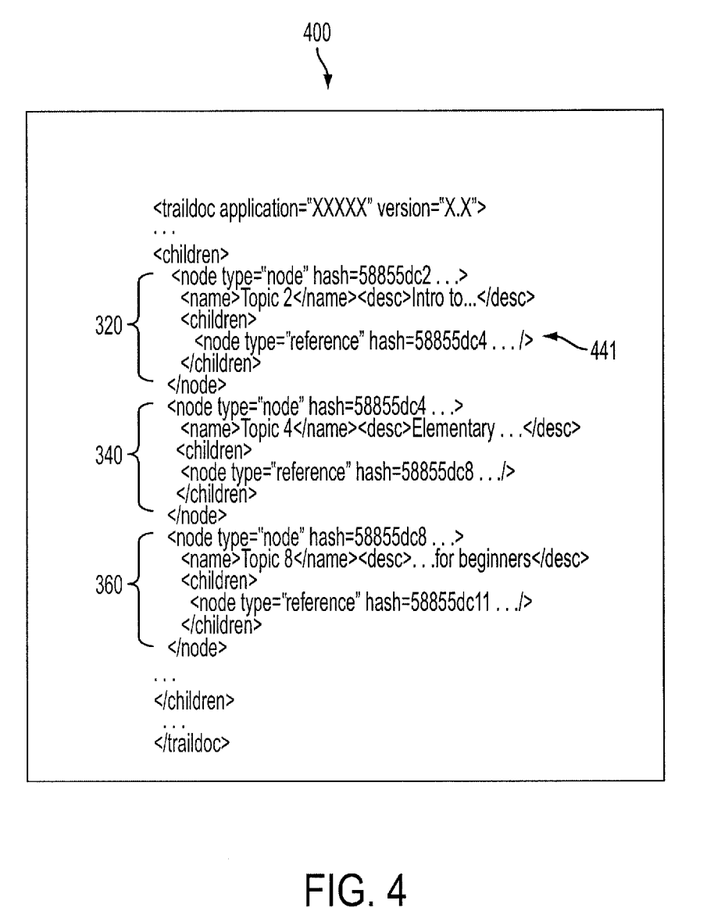
FIG. 4 is an exemplary underlying data structure of an aggregate document slice generated based on the underlying data structure of FIG. 3.

FIG. 4 is an exemplary portion of an underlying XML document 400 representing a content trail slice 200 of FIG. 2 generated from the XML document 300. The slicing unit copied portions of the XML document 300 to the XML document 400 that satisfy the node selection criteria. For example, the user entered the term "introductory" as the node selection criteria and the slicing unit searched for the term "introductory" in the metadata. Additionally, the slicing unit can search for words that are similar or related to "introductory", such as "elementary", "beginner", "intro", and the like. In the present example, the slicing unit copied sections 320, 340, and 360, as well as other sections not included in FIG. 4 for clarity. Since sections 310 and 330 were not copied to the XML document 400, reference to the tag 316 and 317 (FIG. 3) have been omitted in the XML document and have been replaced by a newly generated tag 441 including an identifier corresponding to the node 254 defined by the section 340 to form a connection between the nodes 252 and 254 so that a continuous path exists in the content trail slice.

Figure 5:
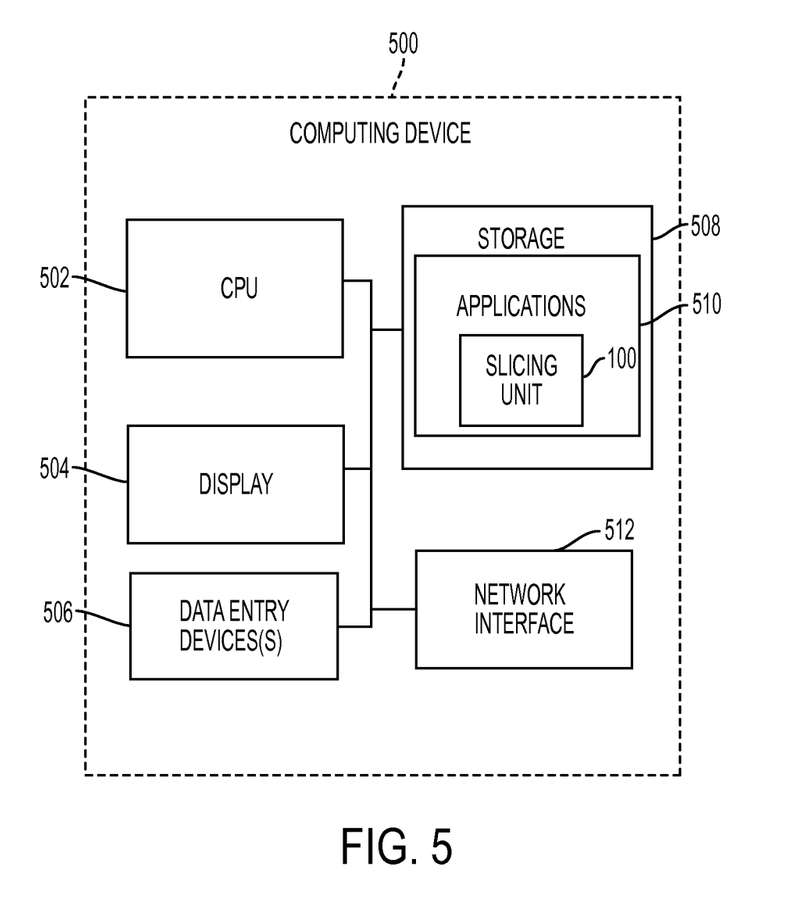
FIG. 5 depicts an exemplary computing device for implementing embodiments of the aggregate document slicing unit.

FIG. 5 depicts an exemplary computing device 500 for creating aggregate document slices using the slicing unit 100. The computing device 500 can be a mainframe; personal computer (PC); laptop computer; workstation; handheld device, such as a PDA and/or smart phone; and the like. In the illustrated embodiment, the computing device 500 includes a central processing unit (CPU) 502 and can include a display device 504. The display device 504 enables the computing device 500 to communicate with an operator through a visual display. The computing device 500 can further include data entry device(s) 506, such as a keyboard, touch screen, microphone, and/or mouse. The computing device 500 can include storage 508 for storing data and instructions. The storage 508 can include computer readable medium technologies, such as a floppy drive, hard drive, compact disc, tape drive, Flash drive, optical drive, read only memory (ROM), random access memory (RAM), and the like.

Applications 510, such as the slicing unit 100, can be resident in the storage 508. The applications 510 can include instructions for implementing the slicing unit 100. The instructions can be implemented using, for example, C, C++, Java, JavaScript, Basic, Perl, Python, assembly language, machine code, and the like. The storage 508 can be local or remote to the computing device 500. The computing device 500 includes a network interface 512 for communicating with a network. The CPU 502 operates to run the applications 510 in storage 508 by executing instructions therein and storing data resulting from the performed instructions, which may be output via a display 504 or by other mechanisms known to those skilled in the art, such a print out from a printer.

Figure 6:
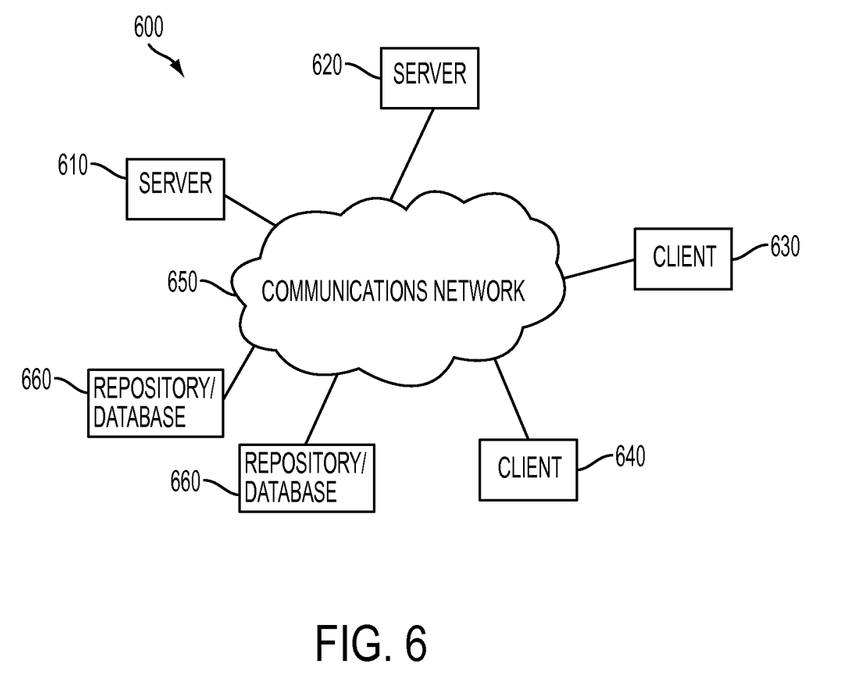
FIG. 6 depicts an exemplary computing system for implementing embodiments of the aggregate document slicing unit in a networked environment.

FIG. 6 depicts an exemplary computing system 600 for implementing embodiments of the slicing unit 100. The computing system 600 includes one or more servers 610 and 620 coupled to clients 630 and 640, via a communication network 650, which can be any network over which information can be transmitted between devices communicatively coupled to the network. The system 600 can also include repositories or database devices 660, which can be coupled to the servers 610/620 and clients 630/640 via the communications network 650. The servers 610/620, clients 630/640, and database devices 660 can be implemented using a computing device, such as a computing device implemented in a similar manner as the computing device 500 of FIG. 5. In some embodiments, the slicing unit 100 can be implemented using a single computing device or can be implemented using multiple computing devices in a distributed manner.

The servers 610/320, clients 630/640, and/or databases 660 can store information, such as instances of the data pages; references to data pages; data page locations; user-defined relationships between the data pages; information associated with the data pages, references, and relationships; aggregate documents; aggregate document slices; and the like. In some embodiments, the slicing unit 100 can be distributed among the servers 610/620, clients 630/640, and database devices 660 such that one or more components of the slicing unit 100 and/or portion of one or more components of the slicing unit 100 can be implemented by a different device (e.g. clients, servers, databases) in the communication network 650. For example, the node selector 120 can be resident on the client 630, the slice creator 130 can be resident on the server 610, and the node connection unit 140 and the start adjuster 150 can be resident on the server 620.

Figure 7:
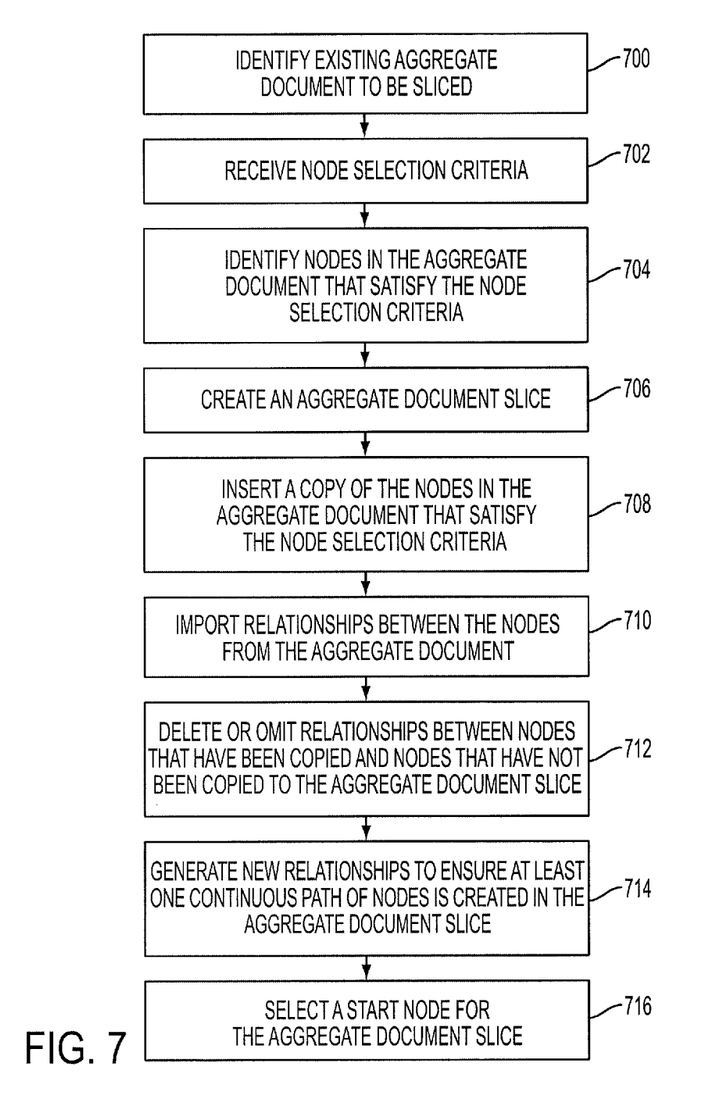
FIG. 7 is a flowchart illustrating a process of slicing an existing aggregate document to generate an aggregate document slice.

FIG. 7 is a flowchart illustrating a process of slicing an aggregate document using an embodiment of the slicing unit 100. To begin, an aggregate document to be sliced is identified (700) and node selection criteria are received from a user (702). The node selection criteria can include a string of characters forming, for example, a word or phrase. Using the node selection criteria, nodes in the aggregate document that satisfy the node selection criteria are identified (704). For example, the node selector criteria can be compared to metadata associated with the nodes of the existing aggregate document.

An aggregate document slice can be created as a separate data structure than the aggregate document (706) and a copy of the nodes in the aggregate document satisfying the node selection criteria can be added to the aggregate document slice (708). Relationships between the nodes in the aggregate document slice can be imported from the aggregate document, where possible (710), and relationships between nodes of the aggregate document slice and nodes that have not been included in the aggregate document slice can be deleted or omitted from the aggregate document slice (712). New relationships can be formed to connect the nodes to ensure at least continuous trail of nodes is created in the aggregate document slice (714). A start node of the trail formed by the aggregate document slice can be selected (716).

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method for generating an aggregate document slice from an existing aggregate document comprising:
  identifying at least three data pages in a plurality of data pages included in an existing aggregate document that satisfy node selection criteria, the node selection criteria including a user entered term having a series of characters, identifying the at least three data pages including searching metadata associated with the existing aggregate document using the node selection criteria;
  creating an aggregate document slice to be a second document different from the existing aggregate document, creating the aggregate document slice comprising:
    inserting into the aggregate document slice a copy of the identified data pages, wherein the pages inserted into the aggregate document slice are a proper subset of the plurality of data pages;
    importing relationships connecting the plurality of data pages included in the existing aggregate document into the aggregate document slice to form at least one continuous path of relationships connecting the data pages inserted into the aggregate document slice, importing the relationships comprising:
      omitting a relationship between a data page inserted in the aggregate document slice and a data page of the existing aggregate document slice when the data page of the existing aggregate document is not included in the aggregate document slice;

generating a new relationship connecting at least two of the pages inserted into the aggregate document slice to establish continuity of the at least one continuous path when the continuity is otherwise lacking; and selecting a start node of the aggregate document slice;

generating a second underlying data structure for the aggregate document slice;

copying portions of a first underlying data structure for the existing aggregate document, the copied portions corresponding to the data pages to be added to the aggregate document slice; and inserting the copied portions of the first underlying data structure into the second underlying data structure.

2. The method of claim 1, wherein the metadata of the existing aggregate document is in a first underlying data structure for the existing aggregate document and identifying the at least three data pages in the existing aggregate document further comprises:

comparing the node selection criteria to the metadata in the first underlying data structure for the existing aggregate document; and selecting the data pages associated with the metadata that satisfies the node selection criteria.

3. The method of claim 1, generating the new relationship further comprising: generating a new connection to one of the data pages in the aggregate document slice from another one of the data pages in the aggregate document slice in response to a determination that none of the remaining data pages in the aggregate document slice connect to the one of the data pages.

4. The method of claim 1, wherein identifying the at least three data pages in the existing aggregate document comprises: searching content of a data page of the plurality of data pages in response to node selection criteria; comparing the node selection criteria to the content in the data page; and selecting the data page when the content satisfies the node selection criteria.

5. The method of claim 1, wherein the aggregate document slice is represented as a content trail.

6. The method of claim 1, wherein inserting the copy into the aggregate document slice further comprises selectively carrying out one of a copying data pages and an extracting data pages procedure.

7. The method of claim 1, wherein creating the aggregate document slice further comprises:

selectively carrying out one of copying portions of the first underlying data structure and extracting portions of the first underlying data structure procedure for the existing aggregate document, the portions corresponding to the data pages to be inserted into the aggregate document slice.

8. A non-transitory computer readable medium storing instructions executable by a computing system including at least one computing device, wherein execution of the instructions implements a method for generating an aggregate document slice from an existing aggregate document comprising:

identifying at least three data pages in a plurality of data pages included in an existing aggregate document that satisfy node selection criteria, the node selection criteria including a user entered term having a series of characters, identifying the at least three data pages including searching metadata associated with the existing aggregate document using the node selection criteria;

creating an aggregate document slice to be a second document different from the existing aggregate document, creating the aggregate document slice comprising:

inserting into the aggregate document slice a copy of the identified data pages, wherein the pages inserted into the aggregate document slice are a proper subset of the plurality of data pages;

importing relationships connecting the plurality of data pages included in the existing aggregate document into the aggregate document slice to form at least one continuous path of relationships connecting the data pages inserted into the aggregate document slice, importing the relationships comprising:

omitting a relationship between a data page inserted in the aggregate document slice and a data page of the existing aggregate document slice when the data page of the existing aggregate document is not included in the aggregate document slice generating a new relationship connecting at least two of the pages inserted into the aggregate document slice to establish continuity of the at least one continuous path when the continuity is otherwise lacking; and selecting a start node of the aggregate document slice;

generating a second underlying data structure for the aggregate document slice;

copying portions of a first underlying data structure for the existing aggregate document, the copied portions corresponding to the data pages to be added to the aggregate document slice; and inserting the copied portions of the first underlying data structure into the second underlying data structure.

9. The medium of claim 8, wherein the metadata of the existing aggregate document is in a first underlying data structure for the existing aggregate document and identifying the at least three data pages in the existing aggregate document further comprises:

comparing the node selection criteria to the metadata in the first underlying data structure for the existing aggregate document; and selecting the data pages associated with the metadata that satisfies the node selection criteria.

10. The medium of claim 8, wherein generating the new relationship further comprises generating a new connection to one of the data pages in the aggregate document slice from another one of the data pages in the aggregate document slice in response to a determination that none of the remaining data pages in the aggregate document slice connect to the one of the data pages.

11. The medium of claim 8, wherein inserting the copy into the aggregate document slice further comprises selectively carrying out one of a copying data pages and an extracting data pages procedure.

12. The medium of claim 8, wherein creating the aggregate document slice further comprises:

selectively carrying out one of copying portions of the first underlying data structure and extracting portions of the first underlying data structure procedure for the existing aggregate document, the portions corresponding to the data pages to be inserted into the aggregate document slice.

13. A system for generating an aggregate document slice from an existing aggregate document comprising:

a computing system including at least one computing device, the computing system configured to:

identify at least three data pages in a plurality of data pages included in an existing aggregate document that satisfy node selection criteria, the node selection criteria including a user entered term having a series of characters, identifying the at least three data pages including searching metadata associated with the existing aggregate document using the node selection criteria;

create an aggregate document slice to be a second document different from the existing aggregate document, creating the aggregate document slice comprising:

inserting into the aggregate document slice a copy of the identified data pages, wherein the pages inserted into the aggregate document slice are a proper subset of the plurality of data pages;

import relationships connecting the plurality of data pages included in the existing aggregate document into the aggregate document slice to form at least one continuous path of relationships connecting the data pages inserted into the aggregate document slice, importing the relationships comprising:

omitting a relationship between a data page inserted in the aggregate document slice and a data page of the existing aggregate document slice when the data page of the existing aggregate document is not included in the aggregate document slice generating a new relationship connecting at least two of the pages inserted into the aggregate document slice to establish continuity of the at least one continuous path when the continuity is otherwise lacking; and selecting a start node of the aggregate document slice;

generating a second underlying data structure for the aggregate document slice;

copying portions of a first underlying data structure for the existing aggregate document, the copied portions corresponding to the data pages to be added to the aggregate document slice; and inserting the copied portions of the first underlying data structure into the second underlying data structure.

14. The system of claim 13, wherein the metadata of the existing aggregate document is in the first underlying data structure for the existing aggregate document and the computing system identifies the at least three data pages in the existing aggregate document by comparing the node selection criteria to the metadata in the first underlying data structure for the existing aggregate document and selecting the data pages associated with the metadata that satisfies the node selection criteria.

15. The system of claim 13, wherein the new relationship is generated to connect one of the data pages in the aggregate document slice to another one of the data pages in the aggregate document slice in response to a determination that none of the remaining data pages in the aggregate document slice connect to the one of the data pages.

16. The system of claim 13, wherein inserting the copy into the aggregate document slice further comprises selectively carrying out one of a copying data pages and an extracting data pages procedure.

17. The system of claim 13, wherein creating the aggregate document slice further comprises:

selectively carrying out one of copying portions of the first underlying data structure and extracting portions of the first underlying data structure procedure for the existing aggregate document, the portions corresponding to the data pages to be inserted into the aggregate document slice.

* * * * *